Dec. 19, 1961  H. E. JACKSON ET AL  3,013,667
PLASTIC COMBINING ELEMENTS
Filed March 14, 1958  3 Sheets-Sheet 3
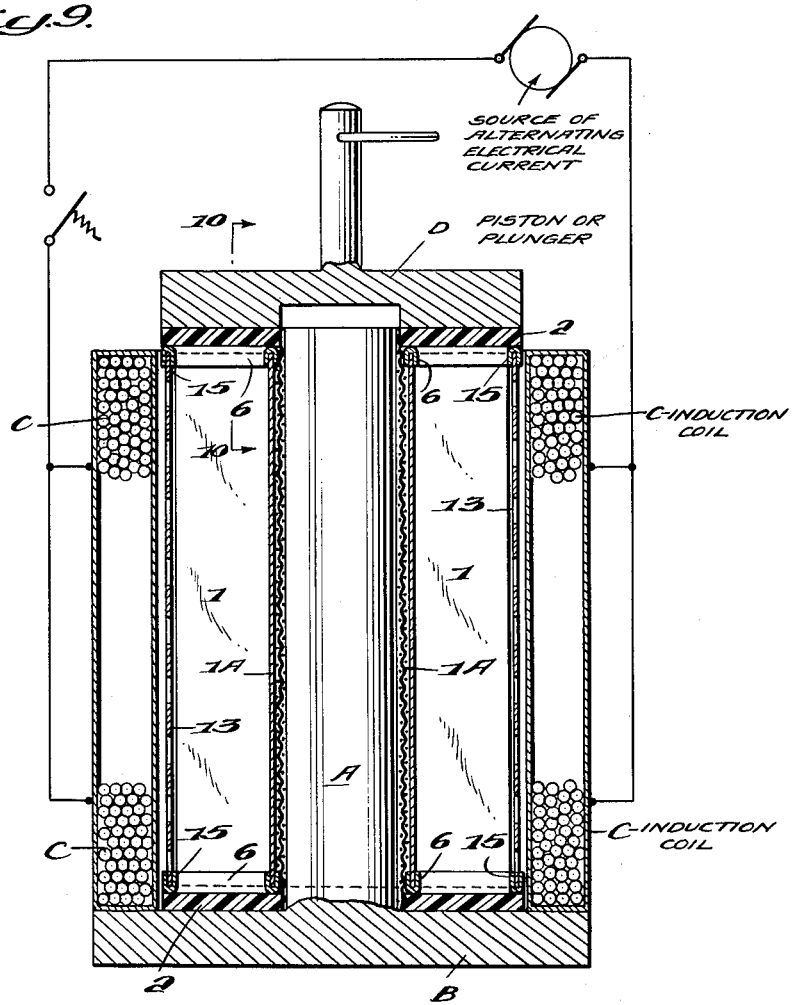
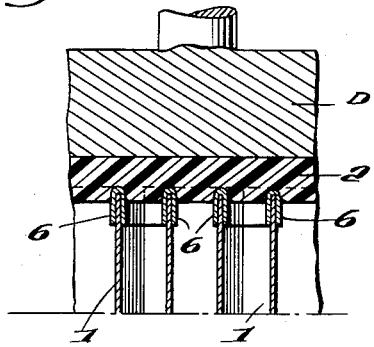
INVENTORS
HAROLD ERNEST JACKSON,
LUDWIG ROSENFELD,
BY
ATTORNEY

United States Patent Office 3,013,667
Patented Dec. 19, 1961

3,013,667
PLASTIC COMBINING ELEMENTS
Harold Ernest Jackson and Ludwig Rosenfeld, Devon, England, assignors to Tecalemit Limited, Brentford, England
Filed Mar. 14, 1958, Ser. No. 721,436
Claims priority, application Great Britain Mar. 15, 1957
6 Claims. (Cl. 210—493)

The present invention relates primarily to the provision of an improved filter cartridge wherein the filter element comprises a porous sheet of material preferably paper, cardboard, felt, woven tissue or the like, in general cylindrical form, closed by and permanently attached to end closures of resinous plastic material in a manner to form a tight liquid-seal with the ends of the filter element; and is concerned with the method of producing such filter as well as with the article so produced. However, it is to be understood that the method of combining these elements is not necessarily limited to the production of filter cartridges per se.

It is well known in the art to combine such a filter element with end caps, of metal or cardboard, wherein one surface of the caps is coated with a resinous mastic and then subjecting the assembly, thus formed, to heat treatment designed to harden the plastic or to cure the plastic, or both. Such known prior art devices are time-consuming in their manufacture due to the several steps employed and do not always result in forming a perfect seal between the filter element and the end caps.

The prime object of the present invention is to dispense with the need for metal or cardboard end caps, mentioned above, as well as to dispense with the additional steps of coating or applying a resinous plastic material to one surface of said caps; and, thus, permit said end caps wholly of a thermo-plastic material, if desired, and hence economizing in the time and materials needed to produce the filter assembly; and further by providing the end edges of the filter element with a stiffening or reinforcing element which facilitates its penetration into the thermoplastic material of said end caps, when said material is softened for this purpose.

A further object of the invention is to provide the stiffening element at the ends of the filter element of such material as to be electrical conductive, when subjected to the field of an electric-inductance coil and with the parts assembled together in contact, which causes the stiff ends of the filter element to heat momentarily the plastic caps in the area of their contact of said edges so that, upon slight pressure being applied upon both caps toward the filter element, the edges of the filter element become embedded into the plastic caps, thus forming a tight liquid-seal with the caps when the heated area of said caps is air-hardened or otherwise subjected to a cooling step.

Other objects and advantages of the present invention will appear from the following detailed description defining the manner of practicing the invention and the structural details of the invention.

In the accompanying drawing, which illustrates the invention, by way of example:

FIGURE 9 is a vertical sectional view of an apparatus on which the parts of the filter may be assembled and by which the end caps may be bonded to the ends of the filter element; and FIGURE 10 is a detailed sectional view taken substantially on line 10—10 of FIGURE 9.

Figure 1:
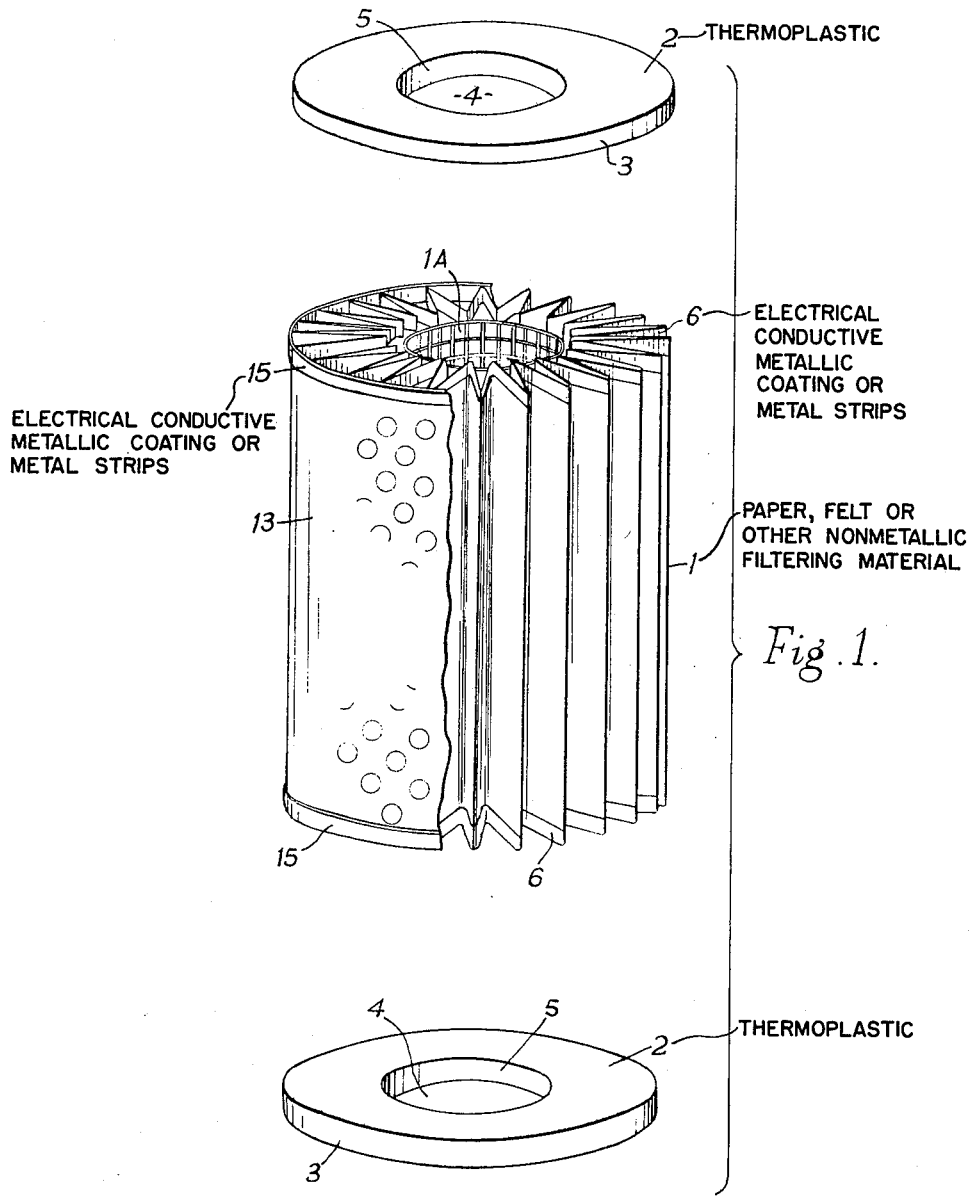
FIGURE 1 is an exploded view of a filter element and its two thermo-plastic discs and shows U-section metal strips fitted on the top and bottom edges of the element.

Referring to the drawings:

The filter cartridge, shown in FIG. 1, comprises a filter element 1 of paper-stock having the required filtering characteristics for the use in which it is to be employed and may be of the pleated type, as shown, shaped in a cylindrical form with a wire supporting frame 1A fitted interiorly thereof in contact with the inner folded edges of the pleated wall of said filter element 1. The pleated filter element 1 may be provided externally, when desired, with a cylindrical perforated jacket 13 of fibreboard, cardboard, metal or plastic material, which together with the frame 1A gives support to, confines and protects the filter element.

Figure 2:
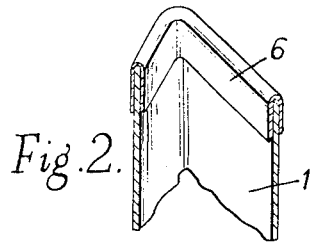
FIGURE 2 is a fragmentary sectional view of the top edge part of the filter element shown in FIGURE 1.

For use in the bonding step, the marginal edge portions at the ends of the filter element 1 are provided with a stiffening element 6 (see FIGS. 1 and 2) of an electrically conductive metal strip 6 of deep U-section which is crimped over the edge of the element before the filter element is formed into its pleated or star-shape shown in FIGURE 1. In this construction, metal strips 15 are also fixed externally on the end parts of the protecting jacket 13.

Figure 3:
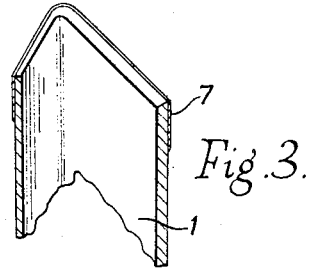
FIGURE 3 is a fragmentary sectional view of the top edge part of a filter element fitted externally with a metal strip.
Figure 4:
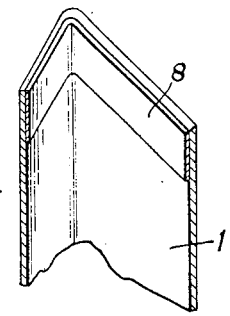
FIGURE 4 is a fragmentary sectional view of the top edge part of a filter element fitted internally with a metal strip.
Figure 5:
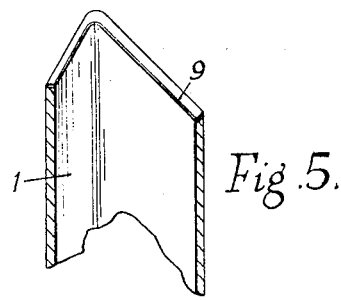
FIGURE 5 is a fragmentary sectional view of the top edge part of a filter element, the extreme edge of which is fitted with metal strip.
Figure 6:
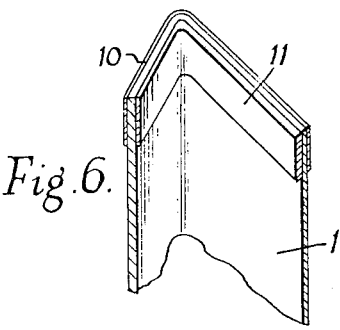
FIGURE 6 is a fragmentary sectional view of the top edge part of a filter element fitted with internal and external metal strips.

In the case of the filter element 1 shown in FIGURE 3, a flat electrical-conductive metal strip 7 is fixed on the outer surface of the end part of the filter paper 1; and, in the case of the filter element 1 shown in FIGURE 4, a flat electrical-conductive metal strip 8 is secured on the inner surface of the end part of the paper, both strips 7 and 8 being fixed to the filter paper 1 by means of adhesive or by other means. In the modified construction shown in FIGURE 5, a flat narrow electrical-conductive metal strip 9 is fixed to the extreme edge only of the filter paper 1; and, in the construction shown in FIGURE 6, flat narrow electrical-conductive metal strips 10 and 11 are secured respectively on the outside and the inside of the paper 1.

Figure 7:
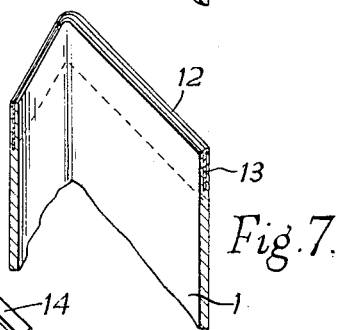
FIGURE 7 is a fragmentary sectional view of the top edge part of a filter element and shows a metal strip embedded in the material of the filter element.
Figure 8:
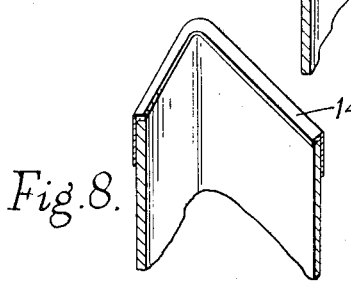
FIGURE 8 is a fragmentary sectional view of the top edge part of a filter element fitted with a metal strip of L-section.

In the construction shown in FIGURE 7 the filter element is provided with a flat electrical-conductive metal strip 12 which is secured in a recess 13 in the thickness of the paper 1; and, in the construction shown in FIGURE 8 an electrical-conductive metal strip 14 of L-section is fixed externally and also over the extreme edge of the paper 1.

It will be understood that in certain constructions where the protecting jacket 13 is not needed, it is not employed.

After the filter element 1 has been formed in the manner just explained and the supporting-frame 1A and the protecting jacket 13 assembled into place, said assembly is fitted at each of its open ends with an annular disc 2 which is preferably formed wholly of a thermo-plastic resin. These discs 2 may be produced by molding, by stamping from sheet material or by other means and may be of a thickness in the order of 3/16 of an inch as generally indicated by its external and internal perimetrical surfaces 3 and 5, the central opening 4 permitting the flow of the liquid, to be filtered, into the interior of the cartridge as is generally understood. As shown in FIG. 1, the external and internal diameters of the cap-discs 2 are such that the reinforced edge 15 of the jacket 13 and the corners of the inner folded edges of the filter element 1 (i.e. adjacent the frame-support 1A) lie within the confines of the edges 3 and 5 of said cap-discs 2, when the said cap-discs 2 are assembled in fitted position at each end of the filter assembly.

With all the parts of the filter cartridge so assembled, as just stated, the assembly is then arranged between suitable holding means and subjected to the field of an electrical inductance coil, resulting in the metallic reinforced edges of the filter element 1 and of the jacket 13, which are in contact with the thermo-plastic caps 2, becoming momentarily so heated to a degree that, upon further pressure being applied by the holding means, the said edges 6, 7, 8, 9, 10—11, 12 or 14 of the filter element 1 and the edge 15 of the jacket 13 become embedded in the thermo-plastic resinous cap 2 to the required depth as will permanently bind the parts together in a unitary structure with a liquid-sealed contact. It will be clear that, by this method of bonding of the discs 2, the filter element 1 and the jacket 13, the bonding is virtually instantaneous and that subsequent standing-time for air-hardening of the bond will be so greatly shortened that production is made both easier and quicker. This is so because the intensity of the heat is limited to the points of contact of the said edges with the discs 2 and the discs 2 are softened only at the zones at which it is required to embed the edges of the element 1 and jacket 13.

If desired, the bonding step of this invention may be performed by first softening the whole of the cap-discs 2, which are then applied to the ends of the filter assembly to bring them against the said edges of the filter element 1 and jacket 13 with sufficient pressure to embed them into said discs: or by heating the cap-discs 2 while being held in assembled position. Still, further, the bonding step of this invention may be practiced by softening the discs 2 to a depth less than the maximum thickness of said discs. These alternative disc-softening methods may be carried out by well known means designed for the application of a controlled degree of heat. However, it is preferred to bond said cap-discs 2 to the filter element 1 and to the jacket 13 by the method first described herein for the reasons given therefor.

To this end, the apparatus shown in FIGURES 9 and 10 may be employed and comprises a base plate B from which extends a central spindle A adapted to extend through the central opening of the filter element, an induction coil C concentrically spaced from the spindle to surround the filter element and a plunger member having a head D movable toward or away from the base plate. The filter element 1 is simply fitted on the spindle A between two end caps 2 and the filter parts are pressed together by means of the hand operated plunger D, while alternating current is passed through the winding or coil C.

The stiffening of the end edges of the filter element 1, as shown and described in connection with FIGS. 1 to 8, inclusive, may be accomplished also by subjecting said edges to a process by which said edges are coated with an electrically-conductive or semi-conductive material, such as by spraying, immersion or dipping, spreading, printing and the like, instead of the application of the strips of metal as at 6, 7, 8, 9, 10—11, 13, 14 and 15—however, the application of said metallic strips is preferred at the present time.

The article produced, in the manner above set forth, results in a rigid inseparable unitary device ready to be inserted in the usual filter casing with the end edges of the filter element 1 and the end edges of the protecting jacket 13 (if a protecting jacket is employed) firmly and solidly embedded in the thermo-plastic cap-discs 2 and within the confines of their inner and outer perimetrical edges 3 and 5, the bond between these elements being such that they are not affected by the heat of the fluid being filtered, as the melting point of the cap-end-discs 2 is far above the temperature of such fluid to be filtered in the normal uses for which the filter cartridge is designed.

From the foregoing it will be manifest that an improved filter cartridge results from the method of constructing the same as above described and that all of the above objects are obtained; and while there has been described and shown herein one type of filter cartridge, it is to be understood that many variations and modifications in the form and arrangement of parts and the detailed construction thereof, as well as in the method of producing the same, may be made without departing from the spirit of this invention, and that all such changes and modifications that fall within the scope of the appended claims are contemplated as part of this invention.

That which is claimed, as new and to be secured by Letters Patent, is:

1. In a method of securing an edge of a sheet of a non-electrical-conductive filter material to a body member comprising a hardened thermo-plastic resin, said method including the steps of providing said sheet material with metallic edge portion; applying a surface of a pre-formed thermo-plastic body member directly to said metallic carrying edge of the sheet material in angular contact therewith; subjecting the metallic edge portion of said sheet to an induced heating to soften said surface of the thermo-plastic body member at the point of its contact with said edge while pressing said edge into the softening thermo-plastic member for a distance; and then relieving said heating and permitting said thermo-plastic member to harden to bond said embedded edge of said sheet material firmly into said thermo-plastic member.

2. In a method of securing opposite edge portions, respectively, of a sheet of filter material to a body member of hardened thermo-plastic resin, said method including the steps of providing said edge portions of said sheet material with an electrical conductive substance, then arranging a surface of a pre-formed body member of hardened thermoplastic resin opposite each said edge portion of the sheet material with said edge portions in angular contact with said surfaces respectively; subjecting the assembled parts momentarily to the field of an electrical inductance coil to soften said surfaces at the point of their contact with the edges of said edge portions while pressing said edges into said thermo-plastic members for a distance of the thickness of said body members; then immediately relieving said assembled parts from the influence of said inductance coil; and then permitting said thermo-plastic members to harden to bond said embedded edge portions, respectively, of said sheet material firmly into its adjacent thermo-plastic member.

3. The method of making a tubular-form filter cartridge having a filter element of sheet material closed solely at its ends by a cap-disc of thermo-plastic resin, said method including the steps of applying a metallic strip to each side edge of an elongated strip of filtering material; pleating said elongated strip of filtering material transversely of its length and shaping the same into tubular-form with said pleats extending axially of said tubular-form; applying solely an end-cap wholly of a pre-formed thermo-plastic resin to each end of said tubular-form and in contact with the metallic strips on its said end edges; then inducing a heating of said metallic end edges of said tubular-form to soften said end-caps at their points of contact with said end edges and pressing said edges into said softened areas of said end-caps; then relieving said heating; and then subjecting said thermo-plastic caps to a cooling step that hardens the points of their softness to firmly bond the parts together.

4. The method as set forth in claim 3 further characterized by applying the metallic strip at each side edge of the elongated strip of filtering material to form a reinforced and stiffened marginal portion on each end of said filtering material.

5. A filter cartridge comprising a pleated filter-element of porous and non-metallic filtering material formed in a generally tubular-form with its pleats extending axially thereof, a metallic material on the marginal end portions of said filter-elements to stiffen said end portions, a cap member wholly of thermo-plastic material having a central aperture therein and extending across each end of said pleated filter-element, respectively, with the stiffened ends of said pleats confined within the area defined by the inner and outer perimeters of said caps and extending into and bonded therein by the thermo-plastic material of said end-caps.

6. A cylindrical filter cartridge comprising a cylindrical filter-element of porous and non-metallic filtering material, a cylindrical jacket surrounding and substantially coextensive with said filter-element, a metallic strip on and extending along each of the marginal end portions of said filter-element and of said jacket, to stiffen their marginal end portions, an end-cap of disc-like annulus formation and wholly of thermo-plastic material extending across each end of said cylindrical filter-element and said jacket, respectively, with the adjacent stiffened marginal edge portions of said filter-element and said jacket confined within the area defined by the inner and outer circumferential edges of said caps and extending into and bonded therein by the thermo-plastic material, itself, of said end-caps.

References Cited in the file of this patent

UNITED STATES PATENTS

| | | |
|---|---|---|
| Re. 22,301 | Pittman | Apr. 13, 1943 |
| 2,663,660 | Layte | Dec. 22, 1953 |
| 2,700,634 | Ackenlind | Jan. 25, 1955 |
| 2,732,031 | Rabbitt | Jan. 24, 1956 |
| 2,739,916 | Parker | Mar. 27, 1956 |